(12) United States Patent
Pinlam et al.

(10) Patent No.: US 6,498,454 B1
(45) Date of Patent: Dec. 24, 2002

(54) AUTOMATIC BATTERY RECHARGING STATION FOR AGVS

(75) Inventors: Watcharin Pinlam, Pathumthanee (TH); Chalor Moogdaharn, Nakornsawan (TH); Youthachai Bupparit, Nonthaburi (TH)

(73) Assignee: Advanced Micro Devices, Sunnyvale, CA (US)

( * ) Notice: Subject to any disclaimer, the term of this patent is extended or adjusted under 35 U.S.C. 154(b) by 0 days.

(21) Appl. No.: 09/864,727

(22) Filed: May 24, 2001

(51) Int. Cl.$^7$ ............................................. H01M 10/46
(52) U.S. Cl. ....................................................... 320/107
(58) Field of Search ................................. 320/103, 104, 320/109; 414/281–286; 104/84

(56) References Cited

U.S. PATENT DOCUMENTS

| | | | |
|---|---|---|---|
| 4,672,280 A | 6/1987 | Honjo | 318/587 |
| 4,777,416 A | 10/1988 | George, II et al. | 318/568 |
| 4,916,441 A | 4/1990 | Gombrich | 340/712 |
| 4,983,903 A | 1/1991 | Bae et al. | 320/2 |
| 5,049,802 A | 9/1991 | Mintus et al. | 320/2 |
| 5,058,016 A | 10/1991 | Davidovitch | 364/424.01 |
| 5,281,919 A | 1/1994 | Palanisamy | 324/427 |
| 5,467,341 A | 11/1995 | Matsukane et al. | 370/17 |
| 5,612,606 A * | 3/1997 | Guimarin et al. | |
| 5,682,605 A | 10/1997 | Salter | 455/54.1 |
| 5,793,413 A | 8/1998 | Hylton et al. | 348/12 |
| 5,949,219 A | 9/1999 | Weiss | 320/136 |
| 6,014,649 A | 1/2000 | Kobayashi et al. | 705/43 |
| 6,097,707 A | 8/2000 | Hodzic et al. | 370/321 |
| 6,107,802 A | 8/2000 | Matthews et al. | 324/427 |
| 6,133,739 A | 10/2000 | Kvaas et al. | 324/426 |

* cited by examiner

Primary Examiner—Edward H. Tso
(74) Attorney, Agent, or Firm—Amin & Turocy, LLP

(57) ABSTRACT

The present invention provides AGV systems with automatic recharging and a central processor for control. The central processor monitors the charge states of the AGVs, assigns them to tasks, and can determines when to recharge the AGVs. The central processor can optimize the operation of the AGVs to achieve various objectives which can include, for example, maximizing AGV availability, maximizing battery life, and/or maximizing recharging station utilization. Systems and methods of the invention can maximize the utilization of AGV equipment and minimize the number of AGVs required to accomplish a given set of tasks.

23 Claims, 5 Drawing Sheets

AUTOMATIC BATTERY RECHARGING STATION FOR AGVS

TECHNICAL FIELD

The present invention generally relates to automated guided vehicle systems, and in particular to an automated guided vehicle system with automatic battery recharging stations.

BACKGROUND OF THE INVENTION

Automatic guided vehicles (AGV) are widely used in a variety of industrial settings, including factories and hospitals. AGVs move automatically from one location to another, generally following a guide wire or track. AGVs are used to transport materials from location to location without requiring a vehicle driver.

Most AGVs are powered by rechargeable batteries. Battery recharging, whether carried out manually or automatically, is a source of disruption and inefficiency in automatic guided vehicle systems.

In a typical manual recharging system, an operator periodically tests the charge state of a vehicle's battery. If the charge state is found to be low, the battery is removed and placed on a battery charger. Labor costs, untimeliness of testing and recharging, and human error are disadvantages of manual testing.

Automatic recharging systems are also available. In a typical automatic recharging system, the AGVs are equipped with battery monitors. When the battery is low the vehicle returns to a recharging station. The location of the recharging station is either pre-programmed into the AGV or is provided by a remote computer in response to a request from the AGV. A disadvantage of this system is that the recharging operations interfere with the productive operation of the AGVs, resulting in the need for more AGVs and greater space to accommodate the additional AGVs. Therefore, there is an unsatisfied need for an AGV system that provides for automatic recharging of AGVs while maximizing the availability of AGVs for productive use.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides AGV systems with automatic recharging and a central processor for control. The central processor monitors the charge states of the AGVs, assigns them to tasks, and can determines when to recharge the AGVs. The central processor can optimize the operation of the AGVs to achieve various objectives which can include, for example, maximizing AGV availability, maximizing battery life, and/or maximizing recharging station utilization. Systems and methods of the invention can maximize the utilization of AGV equipment and minimize the number of AGVs required to accomplish a given set of tasks.

One aspect of the invention provides an automated guided vehicle system comprising a plurality of battery powered guided vehicles, an automatic recharging station for recharging the guided vehicles, and a central processor, wherein the central processor receives task requests, monitors a charge status for the guided vehicles, and selects guided vehicles to perform the tasks.

Another aspect of the invention provides an automated guided vehicle system comprising a plurality of battery powered guided vehicles, means for automatically recharging the vehicles, means for assigning tasks to the vehicles, and means for coordinating automatically recharging the vehicles with assigning tasks to the vehicles.

A further aspect of the invention provides a method of operating a plurality of battery powered guided vehicles comprising using a central processor to assign tasks to the vehicles, monitor a charge status for the vehicles, and control recharging of the vehicles.

The invention extends to features hereinafter fully described and features particularly pointed out in the claims. The following detailed description and the annexed drawings set forth in detail certain illustrative examples of the invention. These examples are indicative of but a few of the various ways in which the principles of the invention may be employed. Other ways in which the principles of the invention may be employed and other objects, advantages and novel features of the invention will be apparent from the detailed description of the invention when consider in conjunction with the drawings.

DETAILED DESCRIPTION OF THE INVENTION

Figure 1:
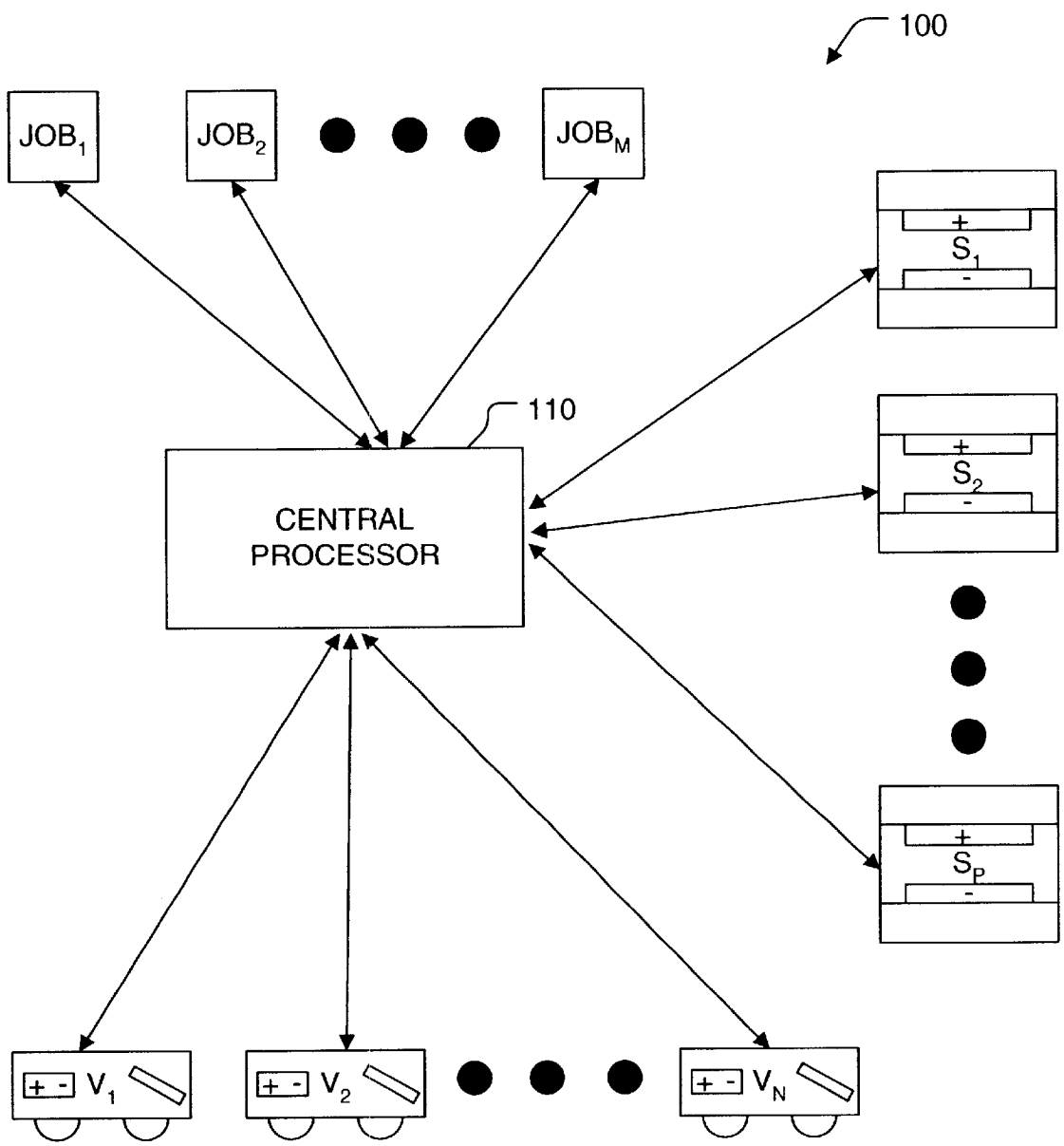
FIG. 1 is a high level schematic illustration of an AGV system according to one aspect of the present invention.

FIG. 1 is a high level schematic illustration of a system 100 provided by one aspect of the present invention. System 100 includes central processor 110, a plurality of AGVs $V_1$ to $V_N$ with $N \geq 2$ (hereinafter "the AGVs"), and automatic recharging stations $S_1$ to $S_P$ with $P \geq 1$ (hereinafter "the automatic recharging stations"). System 100 accepts job requests, $JOB_1$ to $JOB_M$ (hereinafter "the job requests") assigns AGVs to fulfill the job requests, monitors a charge status for the AGVs, and controls the recharging of the AGVs at the automatic recharging stations.

The job requests are requests for services requiring an AGV. The requests can be generated automatically or manually. The request may be sent to central processor 110 by any suitable means. For example, requests may be sent over a local area network, by radio, or by phone The central processor may accept requests made via one or several mechanisms.

The AGVs can be of any suitable type, including, for example, any of those commonly used to transport goods from location to location within factories, hospitals, and like facilities. The AGVs can follow predetermined paths. In one system, the AGVs are laser guided along paths that are laid out with reflective tape or aluminum foil. In another system, the AGVs follow a guide wire. In a further system, the AGVs are provided with programmed directions and a GPS type guidance system. A remote guidance system can also be employed, optionally in conjunction with one of the foregoing systems.

The AGVs have rechargeable batteries. The batteries are of any suitable type such as, for example, lead acid, lithium-ion, lithium-polymer, nickel-cadmium, or nickel-metal hydride. Extended life, low cost, and low self-discharge rate are all desirable features for AGV batteries.

The AGVs are provided with contacts for automatically coupling to at least one of the automatic recharging station. In one aspect of the invention, the AGVs are provided with external contacts, one to either side of the AGV. For example, contact bars extending to either side of the AGV can be employed. The contacts couple with charger heads when the AGVs are docked at a recharging station. Optionally, the contacts are guarded by a flap through which the charge heads pass. Another option is to configure the contacts to extend automatically when the AGV is at a recharging station.

The automatic recharging stations have charger heads for coupling to the contacts of the AGVs. The automatic recharging stations can be provided with sensors to determine when an AGV has docked. Such a sensor can be, for example, an electric eye. There can be one automatic recharging station for each AGV. However, commonly there are fewer automatic recharging stations than AGVs.

Central processor 110 monitors a charge state for the AGVs. Monitoring the charge state for the AGVs comprises gathering battery data from which the battery charge states can be known or estimated whenever charge state information is need. Central processor 110 obtains battery data from either the AGVs or from the recharging stations. The data can be provided continuously, periodically, or intermittently. Where the AGVs provide the battery data, a wireless communication system, such as a radio system, permits the AGVs to communicate the battery data to central processor 110 continuously or periodically. Alternatively, the AGVs can provide intermittent battery data to central processor 110 through connections that engage when the AGVs dock at the automatic recharging stations. Where the battery data is provided only when the AGVs are docked at the recharging stations, the data gathering equipment is conveniently installed in the automatic recharging stations and the automatic recharging stations can provide the battery data.

The battery data is the output of a battery monitor or is data from which the battery status can be determined. Battery status can be determined from a variety of different types of data. For example, voltage under fixed load or absent load can be used to determine battery status. Temperature data can be employed to improve the accuracy of voltage dependent battery status determinations. Where load is variable, additional data such as current or load can be used in conjunction with voltage data. Many other data types can be employed separately or in conjunction with one or more of the foregoing data types. For example, fluid density is indicative of charge in a lead acid battery. Absorption of light at an appropriate wavelength is indicative of charge in a variety of batteries.

Central processor 110 can interpret the battery data to determine the battery charge state or, alternatively, the AGVs or the automatic recharging stations can comprise self-contained battery monitors and provide the charge state to central processor 110. Any suitable battery monitor can be used in implementing this aspect of the present invention.

Where central processor 110 receives battery data relatively infrequently, such as for example, only when the AGVs are docked at automatic recharging stations, the central processor's effectiveness in monitoring the battery status can be augmented with a battery model. Using a battery model, central processor 110 can estimate a battery's current charge status from data such as a previous measure of the battery's charge status, elapsed time since the measure, and data regarding the loads to which the battery has been subjected since the measure was made. For example, a simple battery model can be developed by associating a charge requirement with each task and estimating the battery's current charge status as its charge status as of the last time the charge status was measured less the charge requirements for each of the tasks the AGV has performed using that battery since that measure was made. Much more complicated battery models are available, which can take into account such factors as self-discharge and the detailed nature of the loads to which the battery is subjected.

Central processor 110 employs the battery status in assigning AGVs to fill job requests. Upon receiving a job request, central processor 110 identifies an AGV that has adequate charge to fulfill the task or queues the task for execution when a suitable AGV becomes available. To determine whether an AGV has adequate charge for a task, central processor 110 compares the task's charge requirement to the AGV's battery status. Generally, both the AGV's charge status and the task's charge requirement are determined quantitatively. The task's charge requirement can be determined or estimated by central processor 110. In the simplest case, central processor 110 sets a fixed charge requirement for every task. Central processor 110 can be provided with data on charge requirements for specific tasks or a system for calculating charge requirements for tasks. Alternatively, the task's charge requirement can be provided as part of the job request.

Where there is more than one AGV that can be assigned to a job, central processor 110 can employ any suitable protocol for selecting which AGV to assign. The protocol can be a simple one, for example first-in-first-out (FIFO) or last-in-first-out (LIFO). It is advantageous, however, if central processor 110 also manages the recharging of the AGVs and integrates the task of assigning AGV's to jobs with the task of managing the recharging of the AGVs. Managing the recharging of the AGVs involves determining when an AGV docks at an automatic recharging station and/or determining whether to recharge an AGV that has docked at an automatic recharging station. Having central processor 110 manage the recharging of the AGVs in addition to assigning task the the AGV's increases the potential for central processor 110 to balance considerations of AGV productivity with other considerations such as battery life.

The life times of many rechargeable batteries are affected by the extent to which they are discharged prior to recharging. Lead acid and nickle-metal anhydride batteries last longer if generally subjected to only shallow discharging and are stored in a charged state. Nickle-cadmium batteries, on the other hand, exhibit what are referred to as "memory effects" and last longer if substantially discharged prior to recharging, although like many batteries, there is a lower limit (corresponding to about one volt per cell) below which discharging a nickle-cadmium battery can cause battery damage.

Central processor 110 implements a protocol for assigning AGVs, and in some cases, for managing the recharging of the AGVs. This protocol is designed around one or more criteria. Examples of criteria include maximizing AGV system productivity, maximizing battery life, and rotating the use of AGVs. Where several criteria are employed, one criteria can take precedence over another. For example, maximizing AGV system productivity is often the overriding consideration. In such cases, other criteria, such as maximizing battery life, only affect task assignment or decisions to recharge vehicles when those criteria can be applied without reducing system productivity. On the other hand, a protocol can strike a balance between two criteria.

Figure 2:
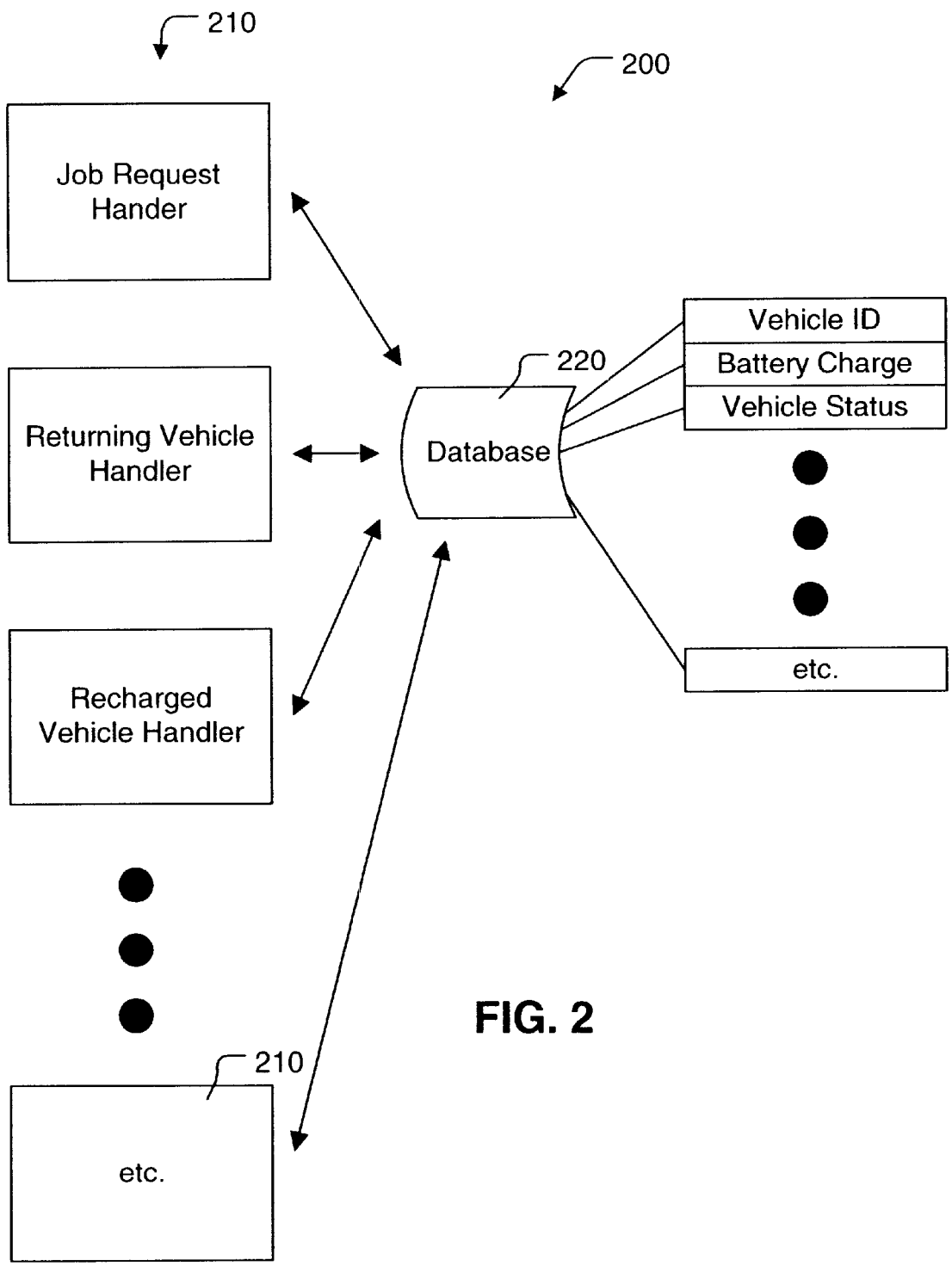
FIG. 2 is a high level schematic of an exemplary software configuration according to another aspect of the present invention.

FIG. 2 provides a schematic diagram of a software configuration 200, which is an example of software that can be provided for central processor 110. Software configuration 200 can be used to implement a variety of protocols for assigning tasks to AGVs and managing the recharging of the AGVs. Software 200 includes a series of subroutines 210 that utilize a common database 220. Subroutines 210 include a job request handler, a returning vehicle handler, and a recharged vehicle handler 216. Database 220 includes data on automated guided vehicles, including battery status.

The job request handler is a subroutine that is called when central processor 110 receives a job request. The job request handler either assigns an AGV to perform the task or queues the job request for fulfilment at a latter time, such as when an AGV becomes available to fulfill the task.

The returning vehicle handler is a subroutine that is called when an AGV completes a task. In one aspect of the invention, central processor 110 can be informed that an AGV has completed a task by a detector that detects the return of an AGV to a station, which can be an automatic recharging station. In another aspect of the invention, an AGV provides a signal via wireless communication, such as radio, when the AGV has completed a task. In a further aspect of the invention, central processor 110 continuously tracks the locations of the AGVs and is able to determine from the location of an AGV that it has completed a task. The returning vehicle handler permits central processor 110 to make a decision whether to recharge an AGV at the time it has completed a task. At the time an AGV completes a task, processor 110 can also determine whether there is a job queued to which the AGV can be immediately assigned.

The recharged vehicle handler is a subroutine that is called when an AGV completes recharging. An AGV's completing recharging can be signaled by the AGV itself, the recharging station, or central processor 110. The recharged vehicle handler can implement such tasks as determining whether there is an AGV waiting to recharge and initiating the recharging of such an AGV.

Database 220 can be configured with a data structure that include, for example, elements such as vehicle ID, battery charge, and vehicle status. For purposes of the following exemplary subroutines, the vehicle status can be a flag representing one of the following vehicle states: "Charged", "In Use", "Charging", "Waiting", and "Out of Service." In the following examples, the "Charged" state indicates the AGV is fully charged and at the base station. Generally, all AGVs begin in the "Charged" state. When the vehicle is out performing a task, its status is "In Use." While being recharged, the vehicle status is "Recharging" and while the vehicle is at the base station, but neither fully charged nor being recharged, the vehicle status is "Waiting". If something is wrong with the vehicle, its status can be set to "Out of Service".

Figure 3:
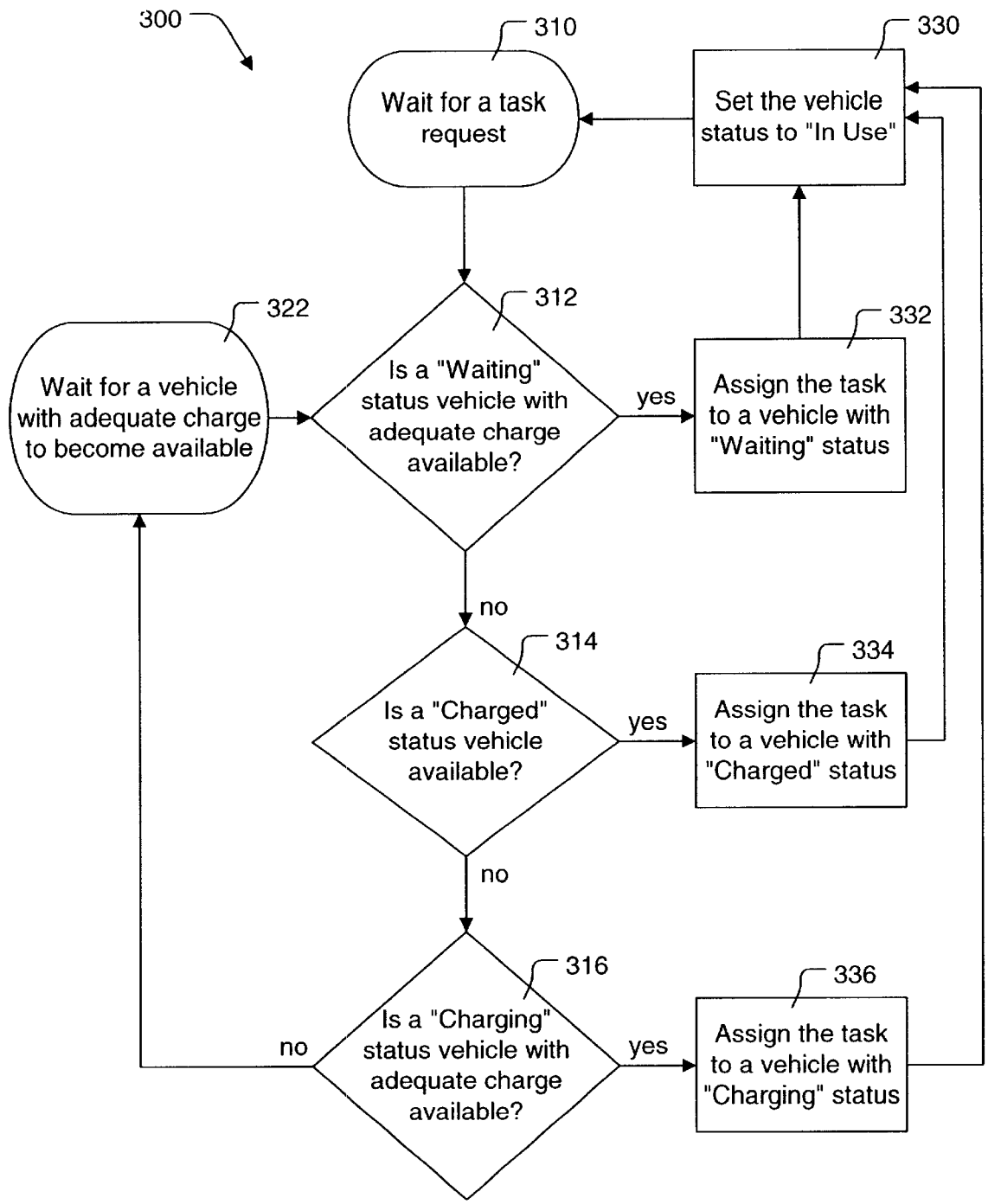
FIG. 3 is a flow diagram of an exemplary task request handler according to a further aspect of the present invention.

FIG. 3 is a flow diagram providing an exemplary job request handler 300 that uses these status flags. Job request handler 300 is configured to provide an AGV for a task whenever one is available, but where a choice is available, to substantially use up the charge on one AGV before bringing another AGV into use.

Job request handler 300 initially waits for a job request in step 310. Upon receiving a job request, job request handler 300 determines in step 312 whether there is a vehicle with "Waiting" status available with adequate charge to perform the current task. If one or more such AGVs are available, the task is assigned to one of them in step 332, the vehicle status is then set to "In Use" in step 330 and job request handler 300 returns to step 310 where it waits for another task request. If a suitable "Waiting" status vehicle is not available, job request handler 300 looks for a "Charged" status vehicle in step 314 and assigns the task to a charged status vehicle in step 334. Step 334 may select one among several "Charged" status vehicle on a LIFO basis to assure each vehicle is used regularly even during periods of relatively light demand for AGVs.

If neither a "Waiting" status nor a "Charged" status vehicle is available, job request handler 300 determines in step 316 whether there is a vehicle in the process of being recharged that can be used to satisfy the job request. If such a vehicle is available, it is assigned to the task in step 336. In some systems, the balance of considerations favors allowing each vehicle to fully recharge before putting it back into service. In other systems, the balance favors satisfying the task request as quickly as possible. One of the advantages of having a central processor that manages both job assignment and AGV recharging is that the central processor can be employed to optimize a variety of different systems.

Where no vehicle is currently available to satisfy the job request, job request handler 300 waits for a vehicle to become available in step 320. If desired, steps 320 and 310 can be combined to allow a subsequent job request to be processed first if it has either a higher priority or can be fulfilled without delaying the earlier job.

Figure 4:
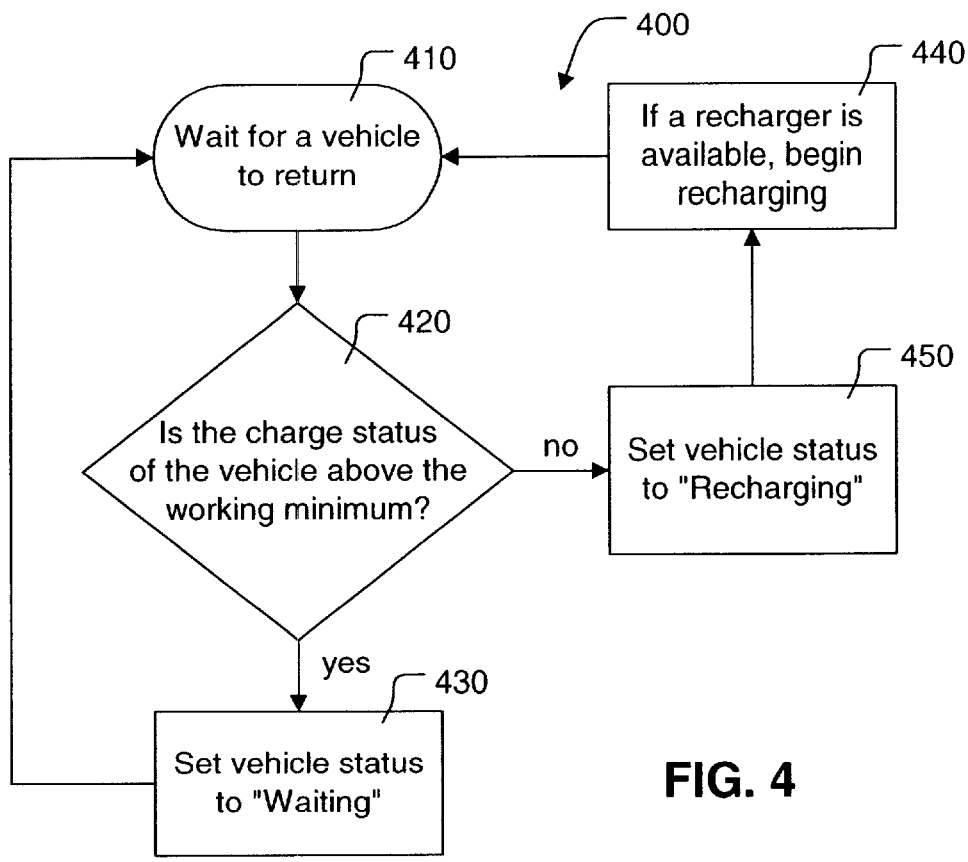
FIG. 4 is a flow diagram of an exemplary returning vehicle handler according to a further aspect of the present invention.
Figure 5:
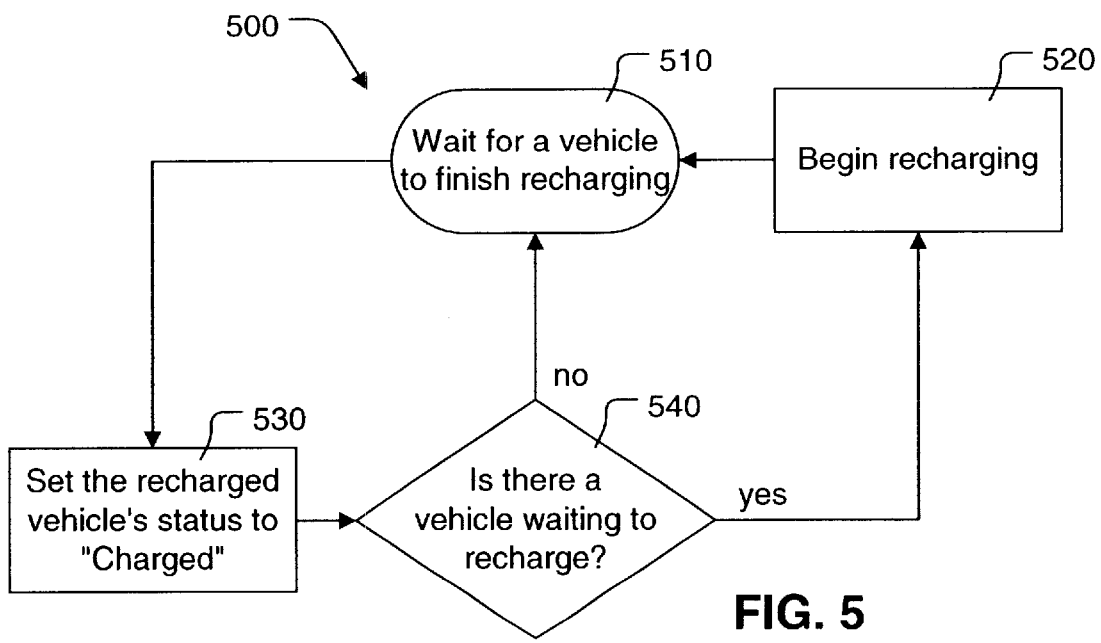
FIG. 5 is a flow diagram of an exemplary recharged vehicle handler according to a further aspect of the present invention.

FIGS. 4 and 5 provide, respectively, a flow diagram of an exemplary returning vehicle handler 400 and a flow diagram of an exemplary recharged vehicle handler 500, which can be used together and in conjunction with Job request handler 300 to use each AGV to full discharge prior to recharging. In step 410, returning vehicle handler 400 waits for the return of an AGV. When an AGV returns, returning vehicle handler 400 determines whether the vehicle has discharged to the desired extent or no longer has sufficient charge to safely complete another task. If the AGV is discharged, its status is set to "recharging" in step 450 and, if a recharger is available, recharging begins in step 440. If the vehicle is not discharged, its status is set to "Waiting" in step 430.

Recharged vehicle handler 500 waits for an AGV to finish recharging in step 510. When an AGV has finished recharging, the vehicle status is set to "Charged" in step 530 and recharged vehicle handler 500 determines whether there is an AGV waiting to be recharged in step 540. If there is such an AGV, its recharging is begin in step 520.

Figure 6:
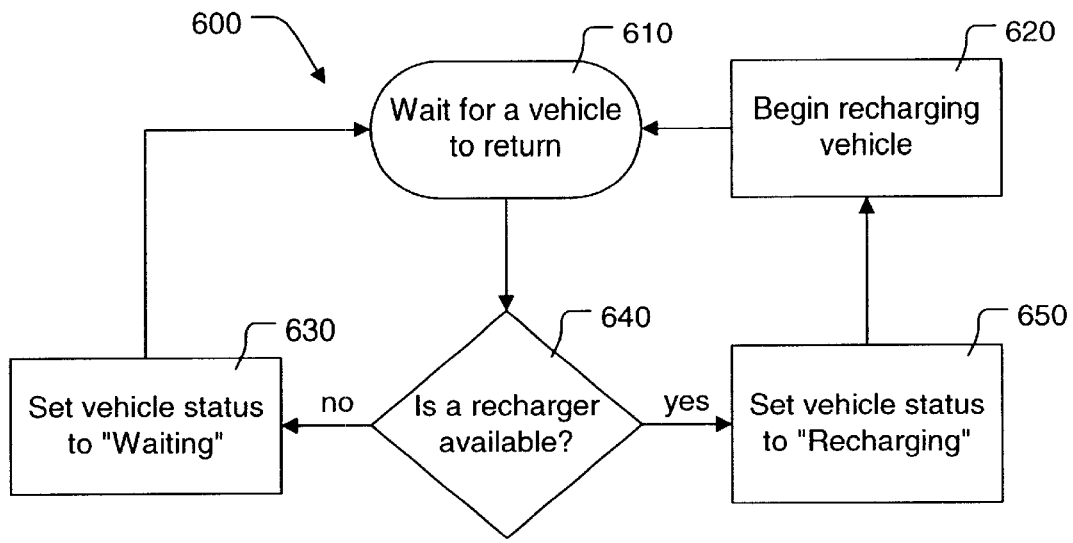
FIG. 6 is a flow diagram of another exemplary returning vehicle handler according to a further aspect of the present invention.
Figure 7:
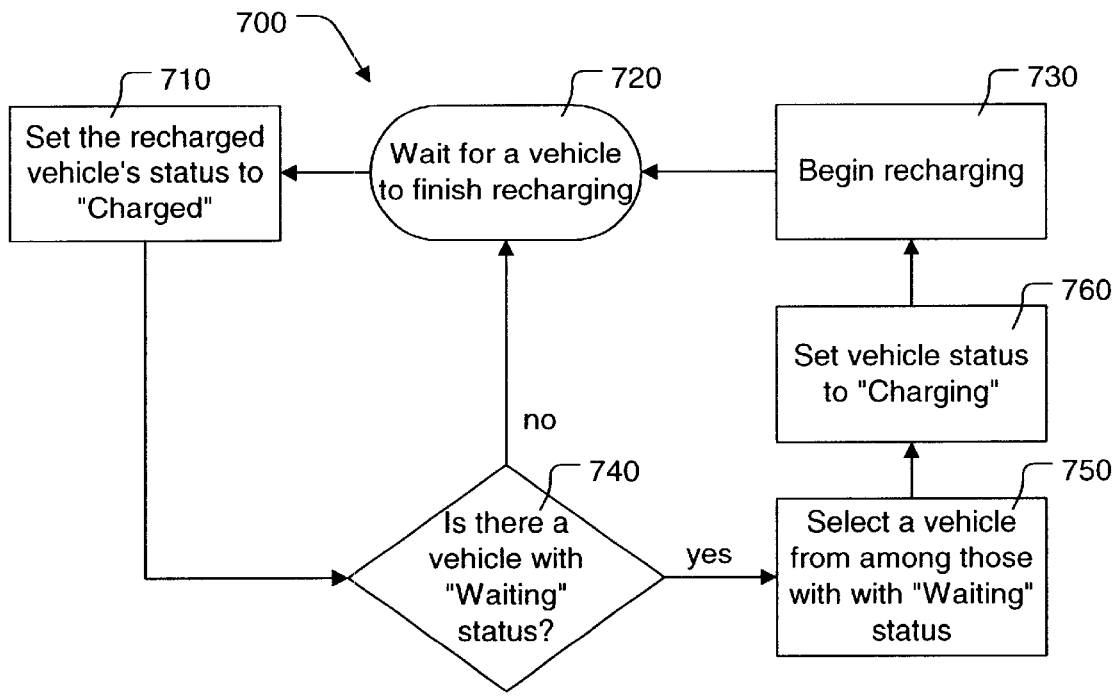
FIG. 7 is a flow diagram of another exemplary recharged vehicle handler according to a further aspect of the present invention

FIGS. 6 and 7 provide, as another pair of examples, flow diagrams of returning vehicle handler 600 and recharged vehicle handler 700, which can likewise be used together and in conjunction with job request handler 300. Returning vehicle handler 600 and recharged vehicle handler 700 differ from returning vehicle handler 400 and recharged vehicle handler 500 in that the former ensure that AGVs that are not in use are always recharging to the extent a charging station is available. Thus, a system using returning vehicle handler 600 and recharged vehicle handler 700 makes fully discharging batteries prior to recharging a consideration entirely secondary to maximizing AGV productivity.

In step 610, returning vehicle handler 600 waits for an AGV to return. When an AGV returns, returning vehicle handler 600 determines whether a recharging station is available is step 640. If one is, the vehicle status is set to "Recharging" in step 650 and recharging of the vehicle is begun in step 620. If not, the vehicle status is set to "Waiting" in step 630.

In step 720, recharged vehicle handler 700 waits for an AGV to finish recharging. When an AGV finishes recharging, recharged vehicle handler 700 determines whether there is an AGV with "Waiting" status in step 740. If there is such an AGV, one is selected for recharging in step 750. The vehicle can be selected, for example, as the vehicle with a "Waiting" status having the least charge. The vehicle's status is set to "Recharging" in step 760 and recharging begun in step 730.

What has been described above is the present invention and several of its specific aspects. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Furthermore, where the term "includes" has been used it is intended to be inclusive in a manner similar to the term "comprising."

What is claimed is:

1. An automated guided vehicle system, comprising:
   a plurality of battery powered guided vehicles
   an automatic recharging station for recharging the guided vehicles; and
   a central processor;
   wherein the central processor receives task requests, monitors a charge status for the guided vehicles, and selects guided vehicles to perform the tasks.

2. The automated guided vehicle system of claim 1, wherein the guided vehicles provide battery data to the central processor via wireless communication.

3. The automated guided vehicle system of claim 1, wherein the automatic recharging station determines battery data for a guided vehicle docked at the automatic recharging station and communicates the battery data to the central processor.

4. The automated guided vehicle system of claim 1, wherein the central processor employs a battery model in monitoring the charge status of the guided vehicles.

5. The automated guided vehicle system of claim 1, wherein the charge status for the guided vehicles includes a quantitative measure of charge in a guided vehicle battery.

6. The automated guided vehicle system of claim 1, wherein the central processor assigns the tasks to the guided vehicles based in part on the charge statuses for the guided vehicles.

7. The automat ed guided vehicle system of claim 6, wherein the central processor assigns the tasks to the guided vehicles based in part on a charge requirement associated with each task.

8. The automated guided vehicle system of claim 7, wherein the central processor determines the charge requirement to associate with each task.

9. The automated guided vehicle system of claim 1, wherein the central processor directs recharging of the guided vehicles at the automatic recharging station.

10. The automated guided vehicle system of claim 9, wherein the central processor assigns tasks to the guided vehicles and directs recharging of the guided vehicles according to a protocol that employs as one criteria preferably discharging guided vehicle batteries to at least a predetermined extent prior to recharging.

11. The automated guided vehicle system of claim 9, wherein the central processor assigns tasks to the guided vehicles and directs recharging of the guided vehicles according to a protocol that employs as one criteria preferably subjecting guided vehicle batteries to only shallow discharges.

12. An automated guided vehicle system, comprising.
   a plurality of battery powered guided vehicles;
   means for automatically recharging the vehicles;
   means for assigning tasks to the vehicles ; and
   means for coordinating automatically recharging the vehicles with assigning tasks to the vehicles.

13. A method of operating a plurality of battery powered guided vehicles, comprising:
   using a central processor to assign tasks to the vehicles, monitor a charge status for the vehicles, and control recharging of the vehicles.

14. The method of claim 13, further comprising employing wireless communication to communicate battery data to the central processor.

15. The method of claim 13, further comprising determining guided vehicle battery data at an automatic recharging station and communicating the battery data to the central processor.

16. The method of claim 13, further comprising employing a battery model in monitoring the charge status for the vehicles.

17. The method of claim 13, wherein the charge status of the guided vehicles includes a quantitative measure of charge in a guided vehicle battery.

18. The method of claim 13, wherein the central processor assigns the tasks to the guided vehicles based in part on the charge status for the guided vehicles.

19. The method of claim 18, wherein the central processor assigns the tasks to the guided vehicles based in part on a charge requirement associated with each task.

20. The method of claim 19, wherein the central processor determines the charge requirement to associate with each task.

21. The method of claim 13, further comprising using the central processor to directs recharging of the guided vehicles at an automatic recharging station.

22. The method of claim 21, wherein the central processor assigns tasks to the guided vehicles and directs recharging of the guided vehicles according to an algorithm that employs as one criteria preferably discharging guided vehicle batteries to at least a predetermined extent prior to recharging.

23. The method of claim 21, wherein the central processor assigns tasks to the guided vehicles and directs recharging of the guided vehicles according to an algorithm that employs as one criteria subjecting guided vehicle batteries to only shallow discharge.

* * * * *